(12) United States Patent
Rizzardini et al.

(10) Patent No.: US 12,164,705 B2
(45) Date of Patent: Dec. 10, 2024

(54) DYNAMIC GRAVITY VECTOR ESTIMATION FOR MEMORY CONSTRAINED DEVICES

(71) Applicant: STMICROELECTRONICS S.r.l., Agrate Brianza (IT)

(72) Inventors: Federico Rizzardini, Settimo Milanese (IT); Lorenzo Bracco, Chivasso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 18/059,214

(22) Filed: Nov. 28, 2022

(65) Prior Publication Data
US 2024/0176427 A1 May 30, 2024

(51) Int. Cl.
*G01B 7/30* (2006.01)
*G06F 3/0346* (2013.01)

(52) U.S. Cl.
CPC .................................. *G06F 3/0346* (2013.01)

(58) Field of Classification Search
None
See application file for complete search history.

(56) References Cited

U.S. PATENT DOCUMENTS

| 9,068,843 | B1 | 6/2015 | Sohn et al. | |
|---|---|---|---|---|
| 11,163,381 | B2 | 11/2021 | Rivolta et al. | |
| 2017/0003751 | A1* | 1/2017 | Micali | G01C 19/00 |
| 2021/0240285 | A1 | 8/2021 | Rizzardini et al. | |
| 2021/0286447 | A1 | 9/2021 | Rizzardini et al. | |

FOREIGN PATENT DOCUMENTS

CN 113280816 A 8/2021

OTHER PUBLICATIONS

Hindle et al., "Inertial-Based Human Motion Capture: A Technical Summary of Current 1 Processing Methodologies for Spatiotemporal and Kinematic Measures," *Hindawi Applied Bionics and Biomechanics*, 2021, Article ID 6628320, Mar. 26, 2021 (14 pages).
"Exponential smoothing," Wikipedia, archived Nov. 26, 2022, 2 URL=https://en.wikipedia.org/w/index.php?title=Exponential_smoothing&oldid=1123906409, download date Dec. 27, 2022. (8 pages).
Manos et al., "Gravity-Based Methods for Heading Computation in Pedestrian Dead Reckoning," *Sensors*, vol. 19, No. 5, Mar. 7, 2019, 19 pages.
Ligorio et al., "A Novel Kalman Filter for Human Motion Tracking With an Inertial-Based Dynamic Inclinometer," *IEEE Transactions on Biomedical Engineering*, vol. 62, No. 8, Aug. 1, 2015, 11 pages.

* cited by examiner

*Primary Examiner* — Carl Adams
(74) *Attorney, Agent, or Firm* — Seed IP Law Group LLP

(57) ABSTRACT

A device includes a memory and processing circuitry coupled to the memory. The processing circuitry, in operation: estimates an angular rate of change and determines a rotational versor based on the rotational data; and estimates a gravity vector based on the angular rate of change and the rotational versor. The processing circuitry generates a dynamic gravity vector based on the estimated gravity vector, a correction factor and an estimated error in estimated gravity vector. The processing circuitry estimates a linear acceleration and determines an acceleration versor based on the acceleration data, and determines the correction factor based on the linear acceleration. The processing circuitry estimates the error in the estimated gravity vector based on the acceleration versor.

21 Claims, 6 Drawing Sheets

DYNAMIC GRAVITY VECTOR ESTIMATION FOR MEMORY CONSTRAINED DEVICES

BACKGROUND

Technical Field

The present disclosure generally relates to gravity vector estimation, for example in portable electronic devices.

Description of the Related Art

Electronic devices, such as smartphones, laptops, smart bands, smart watches, smart pens, etc., often use position, orientation, gesture, motion, location and other information to facilitate the control and operation of the devices. The electronic devices may typically include multiple sensors, such as accelerometers, gyroscopes, pressure sensors, etc., to sense such position, gesture, motion, location and other information.

For example, sensed information may be used to determine or estimate a three-dimensional vector indicating the direction and magnitude of gravity, e.g., a gravity vector.

BRIEF SUMMARY

In an embodiment, a device comprises: a memory; and processing circuitry coupled to the memory. The processing circuitry, in operation: estimates an angular rate of change based on rotational data; determines a rotational versor based on the rotational data; estimates a gravity vector based on the angular rate of change and the rotational versor; estimates a linear acceleration based on acceleration data; determines an acceleration versor based on the acceleration data; determines a correction factor based on the linear acceleration; estimates an error in the estimated gravity vector based on the acceleration versor; and generates a dynamic gravity vector based on the estimated gravity vector, the correction factor and the estimated error in the estimated gravity vector.

In an embodiment, a system comprises: one or more sensors, which, in operation, generate rotational data and acceleration data; and processing circuitry coupled to the one or more sensors. The processing circuitry, in operation: estimates an angular rate of change based on the rotational data; determines a rotational versor based on the rotational data; estimates a gravity vector based on the angular rate of change and the rotational versor; estimates a linear acceleration based on the acceleration data; determines an acceleration versor based on the acceleration data; determines a correction factor based on the linear acceleration; estimates an error in the estimated gravity vector based on the acceleration versor; and generates a dynamic gravity vector based on the estimated gravity vector, the correction factor and the estimated error in the estimated gravity vector.

In an embodiment, a method comprises: estimating an angular rate of change based on rotational data; determining a rotational versor based on the rotational data; estimating a gravity vector based on the angular rate of change and the rotational versor; estimating a linear acceleration based on acceleration data; determining an acceleration versor based on the acceleration data; determining a correction factor based on the linear acceleration; estimating an error in the estimated gravity vector based on the acceleration versor; generating a dynamic gravity vector based on the estimated gravity vector, the correction factor and the estimated error in the estimated gravity vector; and using the dynamic gravity vector to perform an operation of a software application.

In an embodiment, a non-transitory computer-readable medium's contents configure processing circuitry to perform a method, the method comprising: estimating an angular rate of change based on rotational data; determining a rotational versor based on the rotational data; estimating a gravity vector based on the angular rate of change and the rotational versor; estimating a linear acceleration based on acceleration data; determining an acceleration versor based on the acceleration data; determining a correction factor based on the linear acceleration; estimating an error in the estimated gravity vector based on the acceleration versor; generating a dynamic gravity vector based on the estimated gravity vector, the correction factor and the estimated error in the estimated gravity vector; and using the dynamic gravity vector to perform an operation of a software application. In an embodiment, the contents comprise instructions executed by the processing circuitry.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, accelerometers, gyroscopes, physical component layout, processing circuitry, etc., have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figure 1:
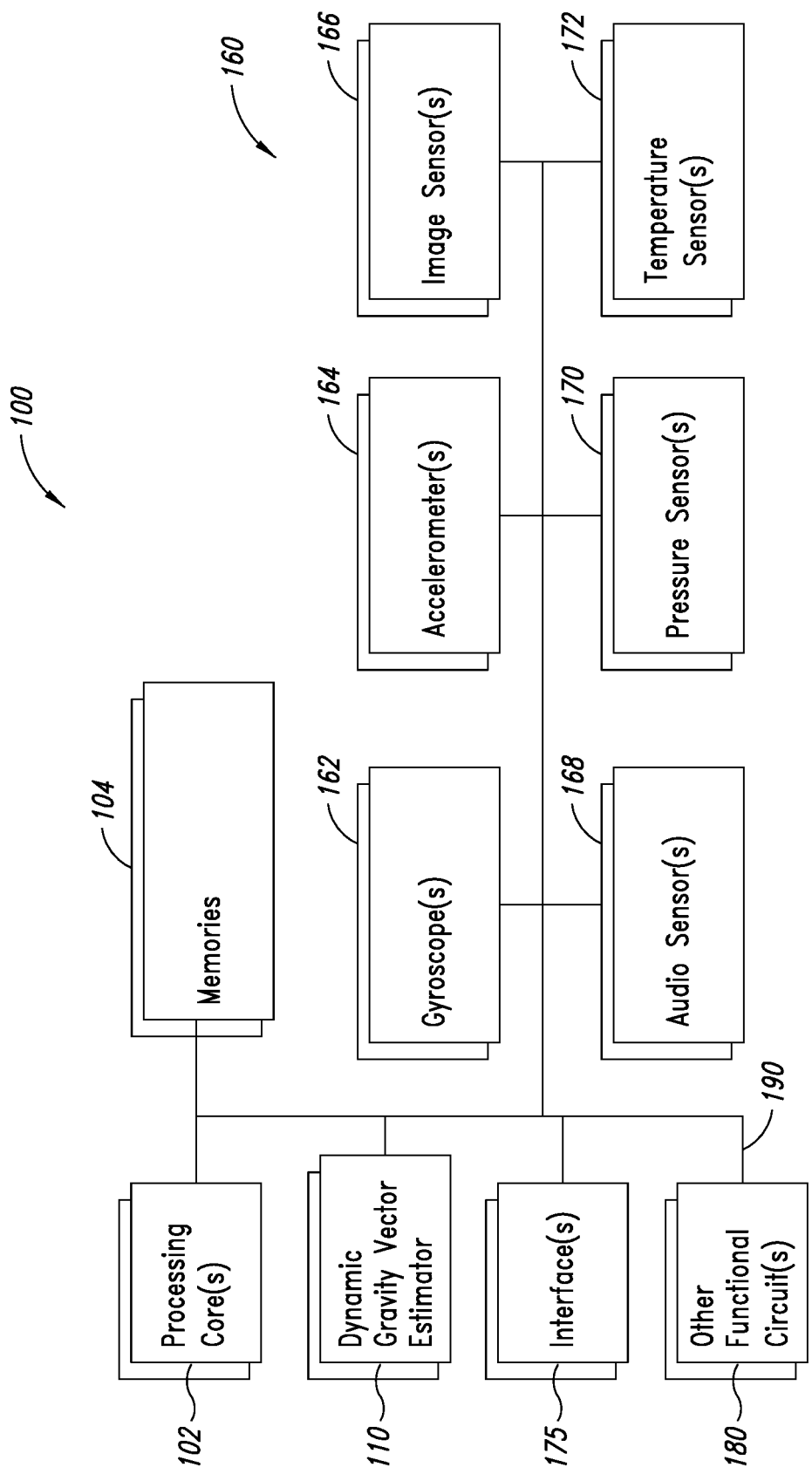
FIG. 1 is a functional block diagram of an embodiment of an electronic device or system.

FIG. 1 is a functional block diagram of an embodiment of an electronic device or system 100. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which may use position, orientation, gesture, motion, gravity vectors, location and other information, and various combinations thereof, to perform various functions), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, which, in operation, may be shared by one or more processes executed by the system 100.

The system 100 may include one or more sensors 160, as illustrated, one or more gyroscopes 162, one or more accelerometers 164, one or more image sensors 166, one or more audio sensors 168, one or more pressure sensors 170, one or more temperature sensors 172, etc., one or more interfaces 175 (e.g., wireless communication interfaces, wired communication interfaces, etc.), and other functional circuits 180, which may include antennas, power supplies, one or more built-in self-test (BIST) circuits, etc., and a main bus system 190. The main bus system 190 may include one or more data, address, power and/or control buses coupled to the various components of the system 100.

The one or more gyroscopes 162, in operation, generate rotational data, and may typically provide an output in the form of a rotational velocity measurements vector indicating a rotational velocity with respect to, for example, three axes of movement. The one or more gyroscopes 162 may typically comprise a micro-electro-mechanical system (MEMS) device that measures the rate of rotation of an object around one or more axis.

The one or more accelerometers 164, in operation, generate acceleration data, and may typically provide an output in the form of an acceleration measurements vector indicating acceleration along, for example, three axes of movement. The one or more accelerometers 164 may typically comprise a MEMS device that measures the acceleration of an object along one or more axis.

The one or more image sensors 166, in operation, generate digital or analog signals based on optical images. The image sensors 166 may typically include a photosensitive element which generates a signal in response to light waves, and may typically provide digital signal in the form of pixel values.

The one or more audio sensors 168, in operation, generate digital or analog signals based on sound waves. The audio sensors 168 may typically comprise a MEMS device which converts sound waves into electrical signals.

The one or more pressure sensors 170, in operation, generate digital or analog signals based on an ambient pressure. The pressure sensors 170 may typically comprise a MEMS device, such as a capacitive sensor, a piezoresistive sensor, etc., which converts an indication of pressure or a pressure change into electrical signals.

The one or more temperature sensors 172, in operation, generate digital or analog signals based on an ambient temperature, temperature differences, etc. The temperature sensors 172 may typically comprise a resistance temperature detector, a semiconductor detector, a junction detector, etc, which converts an indication of a temperature or a temperature change into electrical signals.

The system 100 also includes dynamic gravity vector estimation circuitry 110 which, in operation, estimates a dynamic gravity vector associated with the device based on sensor data, such as sensor data generated by a gyroscope 162 and an accelerometer 164 of the one or more sensors 160, for example, as discussed in more detail below with reference to FIGS. 2-5.

Figure 2:
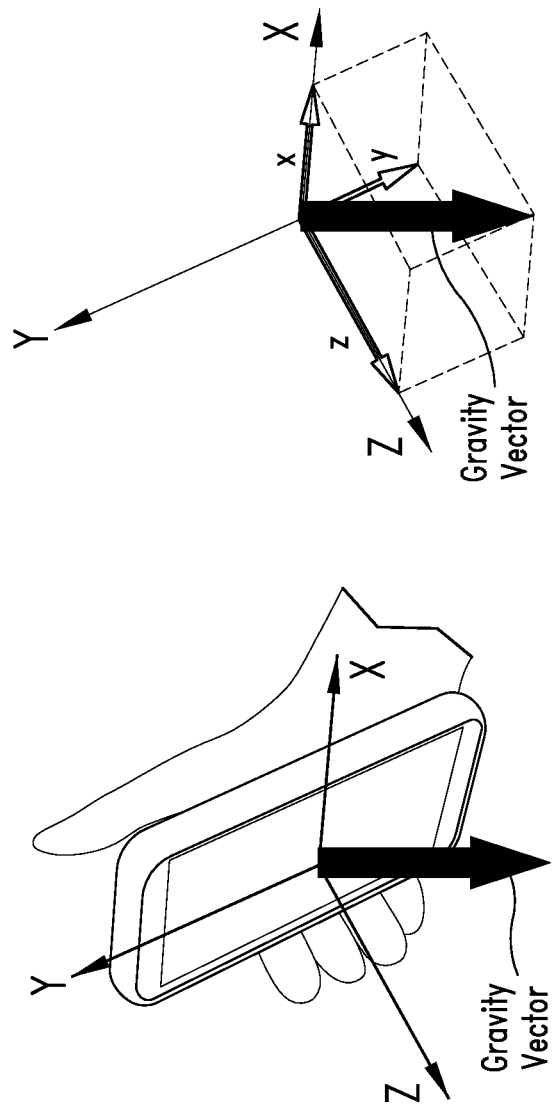
FIG. 2 is a conceptual diagram illustrating a gravity vector associated with an electronic device.

FIG. 2 is a conceptual diagram illustrating a gravity vector associated with a device, as illustrated, a smart phone. Static gravity vector estimation may be obtained by low-pass filtering accelerometer data. Such static gravity vector estimates, however, lack bandwidth and have high latency due to the low-pass filtering, and are not robust against accelerations different from gravity. A dynamic gravity vector may be employed instead, and use of dynamic gravity vectors may be required in some operational frameworks (e.g., Android™ operating system environments). A dynamic gravity vector may be used as an input, for example, to various algorithms, such as tilt or inclination estimation, tilt compensation in pointing devices, smart pens, etc., control of self-balancing robots, virtual joysticks, gaming devices, etc.

A dynamic gravity vector may conventionally be estimated using attitude filter algorithms based on quaternion algebra. For example, based on filtered sensor data, a state of a three-dimensional (3D) orientation may be represented as a Quaternion, a yaw, pitch and roll (e.g., Euler's angles), or a rotation matrix. A gravity vector may then be estimated by rotating an ideal gravity vector (e.g., [0,0,1]) based on the current 3D orientation estimation.

The inventors have realized that in many instances, only an estimation of the gravity vector is needed by an application, and that first generating a representation of a 3D orientation in order to estimate the gravity vector uses substantial memory and computational resources. The inventors also have realized that a dynamic gravity vector may instead be directly estimated based on gyroscope sensor data (e.g., data from a gyroscope 162 of FIG. 1). The estimated dynamic gravity vector may then be corrected based on a linear acceleration correction factor estimated based on accelerometer data (e.g., data from an accelerometer 164 of FIG. 1), without having to generate a representation of a 3D orientation before estimating the dynamic gravity vector. This may be done, for example, using the dynamic gravity vector estimation circuitry 110 of FIG. 1.

Embodiments of the system 100 of FIG. 1 may include more components than illustrated, may include fewer components than illustrated, may combine components, may separate components into sub-components, and various combination thereof. For example, the gravity vector estimator 110 may include a gyroscope 162 and an accelerometer 164 in some embodiments, the gravity vector estimator 110 may be integrated into or implemented by the processing core 102 in some embodiments, a sensor may comprise a combined gyroscope and accelerometer, an inertial measurement unit or device (IMU) package may include an accelerometer, a gyroscope and embedded processing circuitry, which, in operation, implements dynamic gravity vector estimation (see FIG. 6), etc., and various combinations thereof.

Figure 3:
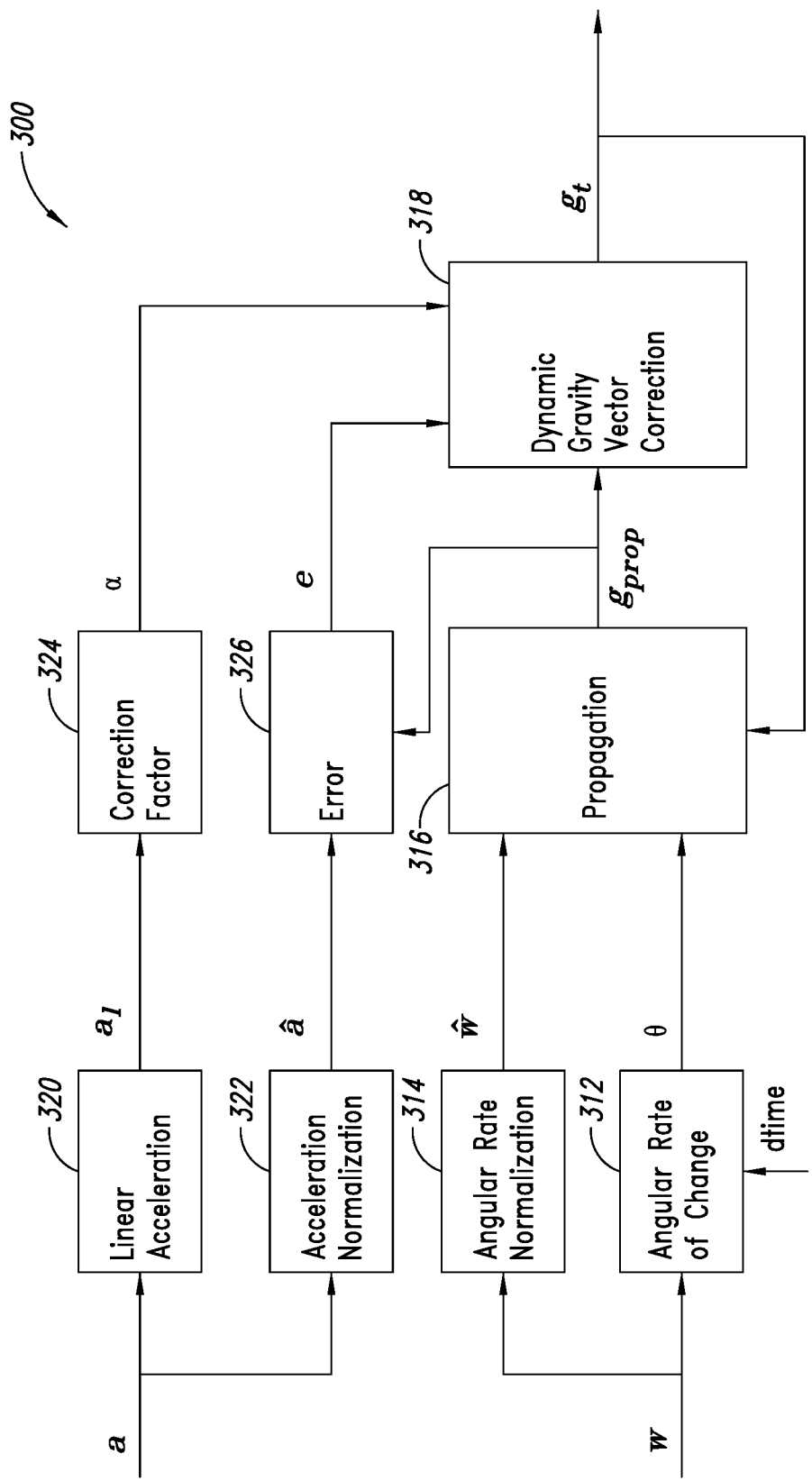
FIG. 3 is a functional block diagram of a dynamic gravity vector estimator according to an embodiment.

FIG. 3 is a functional block diagram of a dynamic gravity vector estimator 300 according to an embodiment. The gravity vector estimator 300 may be employed, for example, as the gravity vector estimator 110 of FIG. 1.

As illustrated, the gravity vector estimator 300 includes an angular rate of change block or circuit 312, an angular rate normalization block or circuit 314, a gravity vector propagation block or circuit 316, a dynamic gravity vector correction block or circuit 318, a linear acceleration block or circuit 320, an acceleration normalization block or circuit 322, a correction factor block or circuit 324, and an error determination block or circuit 326.

The angular rate of change block 312, in operation, receives rotational data w, which may typically be a rotational velocity measurements vector indicating a rotational velocity with respect to three axes of movement, generated by, for example, a gyroscope (see gyroscope 162 of FIG. 1), and generates an estimated angular rate of change $\theta$, which may typically be a scalar value, determined, for example, according to:

$$\theta = |w| d\text{time}$$

where $|w|$ is a magnitude of the rotational data w and dtime is a delta-time interval, which may be an elapsed time between input data samples, a default value, etc. As illustrated, a signal dtime is provided as an input to the angular rate of change block 312. The signal dtime may be a time measure represented in second, and indicative of the time elapsed between two consecutive input data samples (e.g., 0.01 seconds if gyroscope data is generated at 100 Hz).

The rotational data w also is provided to an angular rate normalization block or circuit 314, which, in operation, generates a rotational versor $\hat{w}$, for example, according to:

$$\hat{w} = \frac{w}{|w|}$$

where w is the rotational velocity measurements vector and $|w|$ is the magnitude of the rotational velocity measurements vector.

The gravity vector propagation block or circuit 316, in operation, generates a current estimated gravity vector $g_{prop}$ based on the estimated angular rate of change $\theta$, the rotational versor $\hat{w}$, and a previously determined dynamic gravity vector $g_{t-1}$, for example, according to:

$$g_{prop} = g_{t-1} \cos\theta + (g_{t-1} \times \hat{w})\sin\theta + \hat{w}(g_{t-1} \cdot \hat{w})(1-\cos\theta).$$

Figure 4:
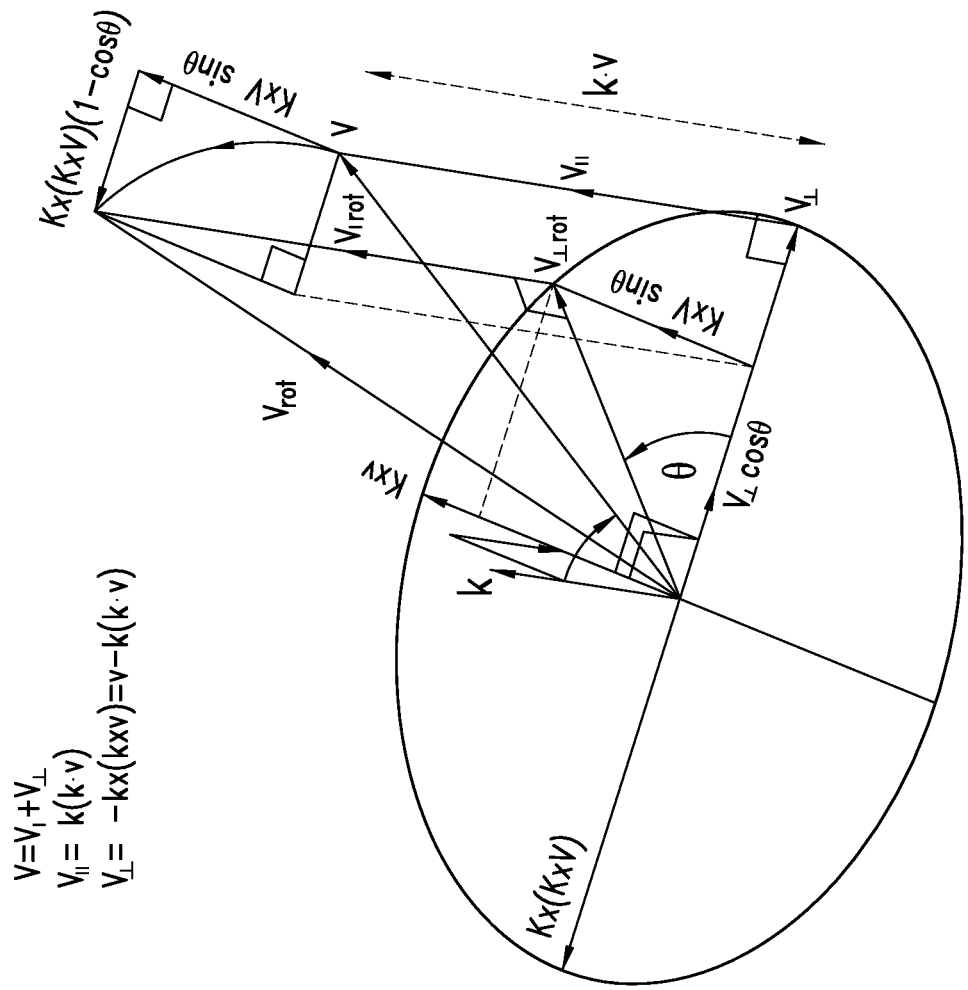
FIG. 4 is a conceptual diagram illustrating the vector geometry of Rodrigues' rotation formula.

FIG. 4 is a conceptual diagram illustrating the vector geometry of Rodrigues' rotation formula, from which the above example of estimating a current gravity vector may be derived. Rodrigues' rotation formula is set forth below for convenience:

$$v_{rot} = v\cos\theta + (k \times v)\sin\theta + k(k \cdot v)(1-\cos\theta).$$

As mentioned above, a dynamic gravity vector may be estimated using gyroscope data, and then corrected based on accelerometer data. The gravity vector correction block 318, in operation, generates a current dynamic gravity vector $g_t$ based on a correction factor $\alpha$ (which may be generated based on acceleration data as discussed below), an error vector e (which may be generated based on normalized acceleration data and $g_{prop}$, as discussed below), and the current estimated gravity vector $g_{prop}$. This may be done, for example, according to:

$$g_t = g_{prop} - \alpha e.$$

The correction factor $\alpha$ may be viewed as a coefficient of a complementary filter used to generate the current dynamic gravity vector $g_t$. As an alternative, the correction can be applied using spherical linear interpolation.

The linear acceleration block or circuit 320, in operation, receives accelerometer data a, which may typically be an acceleration measurements vector indicating acceleration along three axes of movement, generated by, for example, an accelerometer (see accelerometer 164 of FIG. 1), and generates an estimated linear acceleration $a_l$, which may typically be a scalar value, for example equal to or based on a magnitude of the acceleration measurements data, $|a|$. The estimated linear acceleration $a_l$ also may be determined based on a variance of the accelerometer data a, such as the variance of the magnitude of the acceleration, the variance of the components of an acceleration measurements vector, etc. Exponential smoothing may be employed to compute an estimate of the variance, for example, according to:

$$\delta = x - \mu_{t-1}$$

$$\iota = \alpha_s \cdot \delta$$

$$\mu_t = \mu_{t-1} + \iota$$

$$\sigma_t = (1 - \alpha_s) \cdot (\sigma_{t-1} + \delta \cdot \iota)$$

where x is the signal (e.g., one of the components of the acceleration measurements vector or the magnitude of the acceleration measurements vector), $\mu$ is an approximation of the mean, $\sigma$ is an approximation of the variance and $\alpha_s$ is a smoothing factor for controlling the virtual window/number of samples used to estimate the mean and variance.

The accelerometer data a also is provided to the acceleration normalization block or circuit 322, which, in operation, generates an acceleration versor $\hat{a}$, for example, according to:

$$\hat{a} = \frac{a}{|a|}$$

where a is the accelerometer measurements vector and $|a|$ is the magnitude of the acceleration measurements vector.

The correction factor block or circuit 324, in operation, determines a correction factor $\alpha$ based on the estimated linear acceleration $a_l$ generated by the linear acceleration block 320. The correction factor $\alpha$ may typically be a positive scalar value between zero and one, and may typically be a small value, e.g., 0.02. The correction factor may be determined, for example, by comparing the estimated linear acceleration $a_l$ to one or more thresholds. For example, if the estimated linear acceleration $a_l$ exceeds a high threshold $a_{high}$, the correction factor $\alpha$ may be set to a value $\alpha_{low}$ (indicating a low level of trust in the accelerometer data in estimating the dynamic gravity vector, for example zero in case the accelerometer data is not trusted at all); if the estimated linear acceleration $a_l$ is less than a low threshold $a_{low}$, the correction factor $\alpha$ may be set to a value $\alpha_{high}$ (indicating a high level of trust in the accelerometer data in estimating the dynamic gravity vector); if the estimated linear acceleration $a_l$ is between the high threshold $a_{high}$ and the low threshold $a_{low}$, the correction factor α may be set to a value $\alpha_{mid}$ (indicating a normal level of trust in the accelerometer data in estimating the dynamic gravity vector), or may have a variable value set as a function of $a_l$ within a normal range. Setting the correction factor to a high value when the estimated linear acceleration is low facilitates a fast convergence of the estimated gravity vector.

The error determination block or circuit 326, in operation, estimates an error vector e in the current estimated gravity vector $g_{prop}$ based on the acceleration versor â, for example, according to:

$$e = g_{prop} - \hat{a}.$$

As mentioned above, the gravity vector correction block 318, in operation, generates a current dynamic gravity vector $g_t$ based on the correction factor α, the error vector e, and the current estimated gravity vector $g_{prop}$. This may be done, for example, according to:

$$g_t = g_{prop} - \alpha e.$$

Embodiments of the dynamic gravity vector estimator 300 of FIG. 3 may include more components than illustrated, may include fewer components than illustrated, may combine components, may separate components into sub-components, and various combination thereof. For example, the gravity vector estimator 300 may include a gyroscope (see gyroscope 162 of FIG. 1) or an accelerometer (see accelerometer 164 of FIG. 1) in some embodiments, may include one or more processing cores (see processing core 102 of FIG. 1) or memories (see memory 104 of FIG. 1) in some embodiments, which may implement one or more of the components of the dynamic gravity vector estimator 300, etc., and various combinations thereof.

Figure 5:
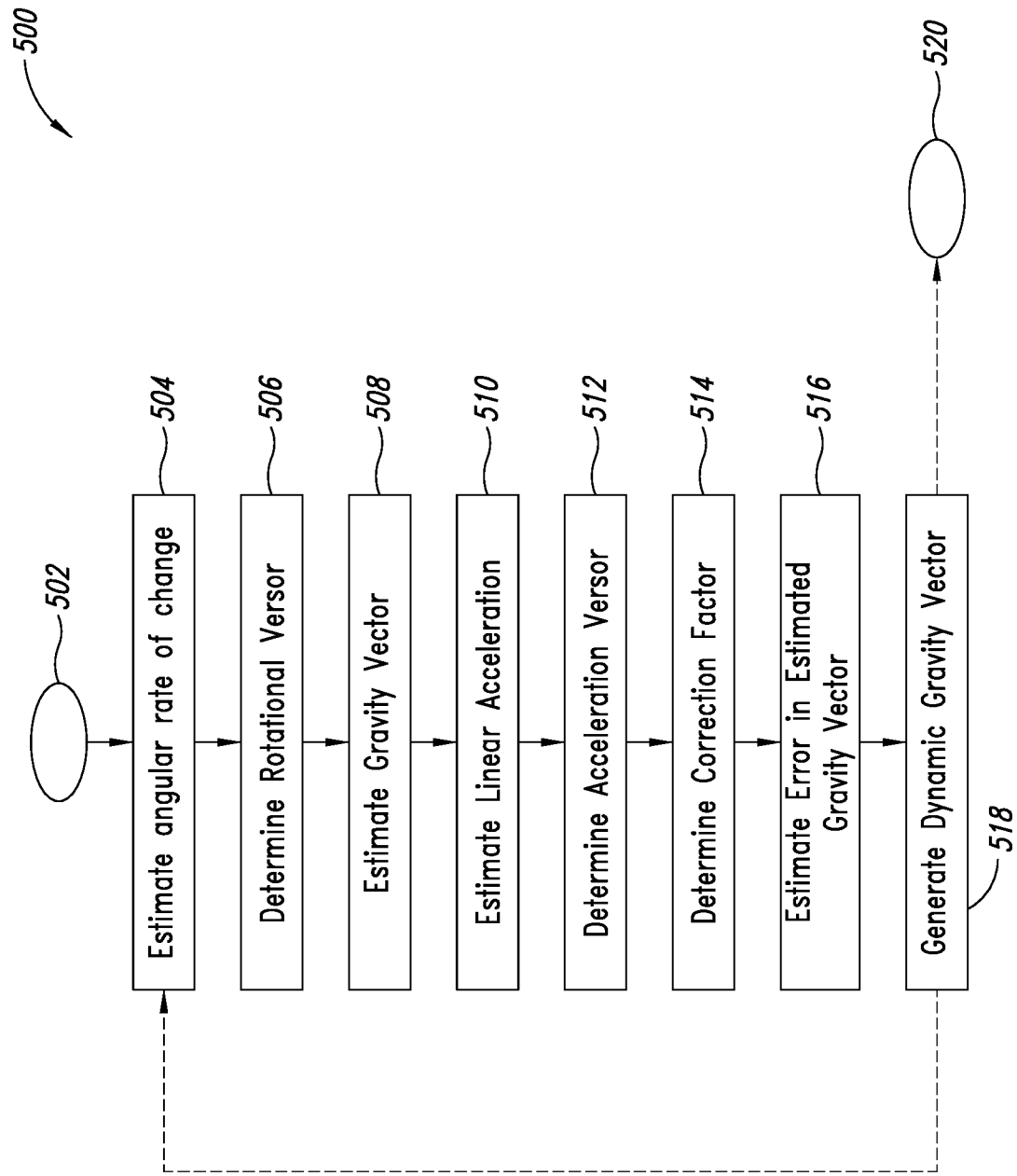
FIG. 5 is a flow diagram illustrating an embodiment of a method of estimating a dynamic gravity vector.

FIG. 5 illustrates an embodiment of a method 500 of generating a dynamic gravity vector, that may be employed by various devices and systems, such as, for example, the dynamic gravity vector estimator 110 of the system of FIG. 1, the dynamic gravity vector estimator 300 of FIG. 3, etc. For convenience, FIG. 5 will be described with reference to the system 100 of FIG. 1 and the dynamic gravity vector estimator 300 of FIG. 3.

The method 500 starts at 502, for example, in response to a request from an application executing on the processor 102 to provide a dynamic gravity vector. The method 500 proceeds from 502 to 504. Although the method 500 is illustrated as a sequential process, the process 500 would typically be executed in a loop processing sample by sample the sensor data, generating a continuous dynamic gravity vector output $g_t$.

At 504, the method 500 estimates an angular rate of change θ. This may be done, for example, according to $$\theta = |w| d\text{time}$$

where |w| is a magnitude of the rotational data w and dtime is a delta-time interval, as discussed above with reference to the angular rate of change block 312 of FIG. 3, based on rotational data generated by, for example, the gyroscope 162 of FIG. 1. The method 500 proceeds from 504 to 506.

At 506, the method 500 generates a rotational versor ŵ. This may be done, for example, according to $$\hat{w} = \frac{w}{|w|}$$

where w is the rotational velocity measurements vector and |w| is the magnitude of the rotational velocity measurements vector, as discussed above with reference to the angular rate normalization block 314 of FIG. 2, based on rotational data w generated by, for example, the gyroscope 162 of FIG. 1. The method 500 proceeds from 506 to 508.

At 508, the method 500 generates a current estimated gravity vector $g_{prop}$ based on the estimated angular rate of change θ determined at 504, the rotational versor ŵ determined at 506, and a previously determined dynamic gravity vector $g_{t-1}$, for example, according to:

$$g_{prop} = g_{t-1} \cos\theta + (g_{t-1} \times \hat{w})\sin\theta + \hat{w}(g_{t-1} \cdot \hat{w})(1 - \cos\theta),$$

as discussed above with reference to gravity vector propagation block 316 of FIG. 1. The method 500 proceeds from 508 to 510.

At 510, the method 500 estimates a linear acceleration $a_l$ based on accelerometer data a, which may typically be an acceleration measurements vector generated by an accelerometer, such as the accelerometer 164. The estimated linear acceleration $a_l$, may typically be a scalar value, for example equal to or based on a magnitude of the acceleration measurements data, |a|, or based on a variance of the accelerometer data a, for example, as discussed above with reference to the linear acceleration block 320 of FIG. 3. The method 500 proceeds from 510 to 512.

At 512, the method 500 determines an acceleration versor â, for example, according to:

$$\hat{a} = \frac{a}{|a|}$$

where a is the accelerometer measurements vector and |a| is the magnitude of the acceleration measurements vector, as discussed above with reference to the acceleration normalization block 322 of FIG. 3, based on acceleration data a generated by, for example, the accelerometer 164 of FIG. 1. The method 500 proceeds from 512 to 514.

At 514, the method 500 determines a correction factor α based on the estimated linear acceleration $a_l$ determined at 510. This may be done, for example, using thresholds, as discussed above with reference to the linear acceleration block 320 of FIG. 3. The method 500 proceeds from 514 to 516.

At 516, the method 500 estimates an error vector e in the current estimated gravity vector $g_{prop}$ determined at 508 based on the acceleration versor â determined at 512, for example, according to:

$$e = g_{prop} - \hat{a}.$$

See the discussion of the error determination block 326 of FIG. 3. The method 500 proceeds from block 516 to block 518.

At block 518, the method 500 generates a dynamic gravity vector gr based on the correction factor α determined at 514, the error vector e determined at 516, and the current estimated gravity vector $g_{prop}$ determined at 508. This may be done, for example, according to:

$$g_t = g_{prop} - \alpha e,$$

as discussed above with reference to the dynamic gravity vector correction circuit 318. The method 500 returns to 504 to continue the dynamic gravity vector generation process 500, or proceeds to 520 when it is determined that generation of a dynamic gravity vector is no longer desired (e.g., in response to deactivation of an enable signal, in response to expiration of a threshold period of time, in response to a defined event, etc.), or combinations thereof (e.g., proceeds to 520 and returns to 504). At 520, the method 500 may perform other processes, perform an operation of a calling application using the dynamic gravity vector, etc.

Embodiments of the foregoing processes and methods may contain additional acts not shown in FIG. 5, may not contain all of the acts shown in FIG. 5, may perform acts shown in FIG. 5 in various orders, may combine acts, may split acts into separate acts, and may be otherwise modified in various respects. For example, FIG. 5 may be modified to combine acts 504 and 506, to combine acts 510 and 512, to perform acts 504, 506, 510 and 512 in parallel, to include an explicit determination of whether to return to 504 after 518 or proceed to 520, etc, and various combinations thereof.

Figure 6:
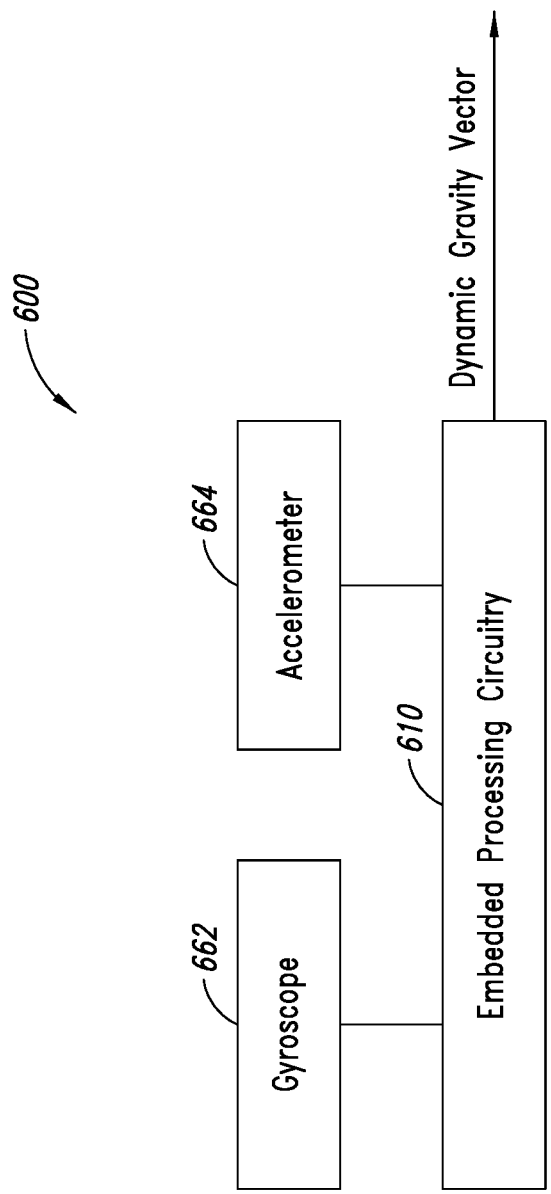
FIG. 6 is a functional block diagram of an embodiment of an inertial measurement unit or device (IMU) package.

FIG. 6 is a functional block diagram of an inertial measurement unit or device (IMU) package 600. The IMU package 600 comprises a gyroscope 662, an accelerometer 664 and embedded processing circuitry 610.

The gyroscope 662, in operation, generates rotational data, and may typically provide an output in the form of a rotational velocity measurements vector indicating a rotational velocity with respect to, for example, three axes of movement. The gyroscope 662 may typically comprise a micro-electro-mechanical system (MEMS) device that measures the rate of rotation of an object around one or more axis. The accelerometer 664, in operation, generates acceleration data, and may typically provide an output in the form of an acceleration measurements vector indicating acceleration along, for example, three axes of movement. The accelerometer 664 may typically comprise a MEMS device that measures the acceleration of an object along one or more axis.

The embedded processing circuitry 610, in operation, estimates a dynamic gravity vector associated with the device 600 based on sensor data, such as sensor data generated by the gyroscope 662 and the accelerometer 664, for example, as discussed in more detail above with reference to FIGS. 2-5.

Embodiments of the device 600 of FIG. 6 may include more components than illustrated, may include fewer components than illustrated, may combine components, may separate components into sub-components, and various combination thereof. For example, additional sensors, such as additional gyroscopes or accelerometers, other types of sensors, etc., may be included in the IMU package 600 in some embodiments.

Simulations and tests indicate embodiments of the methods, devices and systems disclosed herein may provide a 46% improvement in execution time while reducing the amount of ROM needed by a factor of 6.4 and the amount of RAM needed by a factor of 8.9, as compared to conventional low-power implementations using attitude filter algorithms based on quaternion algebra to generate a dynamic gravity vector.

In an embodiment, a device comprises: a memory; and processing circuitry coupled to the memory. The processing circuitry, in operation: estimates an angular rate of change based on rotational data; determines a rotational versor based on the rotational data; estimates a gravity vector based on the angular rate of change and the rotational versor; estimates a linear acceleration based on acceleration data; determines an acceleration versor based on the acceleration data; determines a correction factor based on the linear acceleration; estimates an error in the estimated gravity vector based on the acceleration versor; and generates a dynamic gravity vector based on the estimated gravity vector, the correction factor and the estimated error in the estimated gravity vector. In an embodiment, the device comprises: a gyroscope, which, in operation, generates the rotational data; and an accelerometer, which, in operation, generates the acceleration data. In an embodiment, the gyroscope, in operation, generates a rotational velocity measurements vector indicating a rotational velocity with respect to three axes of movement; and the accelerometer, in operation, generates an acceleration measurements vector indicating acceleration along the three axes of movement. In an embodiment, the processing circuitry, in operation, estimates the angular rate of change according to:

$$\theta = |w|dtime,$$

where $\theta$ is the estimated angular rate of change, $|w|$ is a magnitude of the rotational velocity measurements vector w and dtime is a delta-time interval. In an embodiment, the processing circuitry, in operation, determines the rotational versor according to:

$$\hat{w} = \frac{w}{|w|},$$

where $\hat{w}$ is the determined rotational versor, w is the rotational velocity measurements vector and $|w|$ is a magnitude of the rotational velocity measurements vector. In an embodiment, the processing circuitry, in operation, estimates the gravity vector according to:

$$g_{prop} = g_{t-1} \cos\theta + (g_{t-1} \times \hat{w})\sin\theta + \hat{w}(g_{t-1} \cdot \hat{w})(1-\cos\theta),$$

where $g_{prop}$ is the estimated gravity vector, $\theta$ is the estimated angular rate of change, and $g_{t-1}$ is a previous dynamic gravity vector. In an embodiment, the processing circuitry, in operation, generates the dynamic gravity vector according to:

$$g_t = g_{prop} - \alpha e,$$

where $g_t$ is the dynamic gravity vector, $g_{prop}$ is the estimated gravity vector, $\alpha$ is the correction factor, and e is the error vector. In an embodiment, the processing circuitry, in operation, estimates the linear acceleration based on a magnitude of the acceleration measurements vector. In an embodiment, the processing circuitry, in operation, estimates the linear acceleration based on a variance of the acceleration data. In an embodiment, the processing circuitry, in operation, applies exponential smoothing to estimate the linear acceleration. In an embodiment, the processing circuitry, in operation, determines the acceleration versor according to:

$$\hat{a} = \frac{a}{|a|}$$

where $\hat{a}$ is the acceleration versor, a is the accelerometer measurements vector and $|a|$ is a magnitude of the acceleration measurements vector. In an embodiment, the correction factor is a value between 0 and 1, and the processing circuitry, in operation, determines the correction factor based on a comparison of the estimated linear acceleration to one or more thresholds. In an embodiment, the processing circuitry, in operation: in response to the comparison indicating the estimated linear acceleration exceeds a first threshold, sets the correction factor to a first correction value; and in response to the comparison indicating the estimated linear acceleration is less than a second threshold, sets the correction factor to a second correction value, wherein the first threshold is higher than the second threshold and the first value is lower than the second value. In an embodiment, the processing circuitry, in operation: in response to the comparison indicating the estimated linear acceleration is between the first threshold and the second threshold, sets the correction factor to a third correction value between the first correction value and the second correction value. In an embodiment, the processing circuitry, in operation, estimates the error in the estimated gravity vector according to:

$$e = g_{prop} - \hat{a}.$$

where e is the error in the estimated gravity vector $g_{prop}$, and $\hat{a}$ is the acceleration versor.

In an embodiment, a system comprises: one or more sensors, which, in operation, generate rotational data and acceleration data; and processing circuitry coupled to the one or more sensors. The processing circuitry, in operation: estimates an angular rate of change based on the rotational data; determines a rotational versor based on the rotational data; estimates a gravity vector based on the angular rate of change and the rotational versor; estimates a linear acceleration based on the acceleration data; determines an acceleration versor based on the acceleration data; determines a correction factor based on the linear acceleration; estimates an error in the estimated gravity vector based on the acceleration versor; and generates a dynamic gravity vector based on the estimated gravity vector, the correction factor and the estimated error in the estimated gravity vector. In an embodiment, the one or more sensors comprise: a gyroscope, which, in operation, generates the rotational data as a rotational velocity measurements vector indicating a rotational velocity with respect to three axes of movement; and an accelerometer, which, in operation, generates the acceleration data as an acceleration measurements vector indicating acceleration along the three axes of movement. In an embodiment, the processing circuitry, in operation, estimates the angular rate of change according to:

$$\theta = |w|d\text{time},$$

where $\theta$ is the estimated angular rate of change, $|w|$ is a magnitude of the rotational velocity measurements vector w and dtime is a delta-time interval. In an embodiment, the processing circuitry, in operation, determines the rotational versor according to:

$$\hat{w} = \frac{w}{|w|},$$

where $\hat{w}$ is the determined rotational versor, w is the rotational velocity measurements vector and $|w|$ is a magnitude of the rotational velocity measurements vector. In an embodiment, the processing circuitry, in operation, estimates the gravity vector according to:

$$g_{prop} = g_{t-1} \cos \theta + (g_{t-1} \times w) \sin \theta + \hat{w}(g_{t-1} \cdot \hat{w})(1 - \cos \theta),$$

where $g_{prop}$ is the estimated gravity vector, $\theta$ is the estimated angular rate of change, and gt−1 is a previous dynamic gravity vector. In an embodiment, the processing circuitry, in operation, generates the dynamic gravity vector according to:

$$g_t = g_{prop} - \alpha e,$$

where $g_t$ is the dynamic gravity vector, $g_{prop}$ is the estimated gravity vector, $\alpha$ is the correction factor, and e is the error vector. In an embodiment, the processing circuitry, in operation, determines the acceleration versor according to:

$$\hat{a} = \frac{a}{|a|}$$

where $\hat{a}$ is the acceleration versor, a is the accelerometer measurements vector and $|a|$ is a magnitude of the acceleration measurements vector. In an embodiment, the correction factor is a value between 0 and 1, and the processing circuitry, in operation, determines the correction factor based on a comparison of the estimated linear acceleration to one or more thresholds. In an embodiment, the processing circuitry, in operation, estimates the error in the estimated gravity vector according to:

$$e = g_{prop} - \hat{a}.$$

where e is the error in the estimated gravity vector $g_{prop}$ and $\hat{a}$ is the acceleration versor.

In an embodiment, a method comprises: estimating an angular rate of change based on rotational data; determining a rotational versor based on the rotational data; estimating a gravity vector based on the angular rate of change and the rotational versor; estimating a linear acceleration based on acceleration data; determining an acceleration versor based on the acceleration data; determining a correction factor based on the linear acceleration; estimating an error in the estimated gravity vector based on the acceleration versor; generating a dynamic gravity vector based on the estimated gravity vector, the correction factor and the estimated error in the estimated gravity vector; and using the dynamic gravity vector to perform an operation of a software application. In an embodiment, the method comprises: generating the rotational data as a rotational velocity measurements vector indicating a rotational velocity with respect to three axes of movement; and generating the acceleration data as an acceleration measurements vector indicating acceleration along the three axes of movement. In an embodiment, the method comprises: estimating the angular rate of change according to:

$$\theta = |w|d\text{time},$$

where $\theta$ is the estimated angular rate of change, $|w|$ is a magnitude of the rotational velocity measurements vector w and dtime is a delta-time interval; determining the rotational versor according to:

$$\hat{w} = \frac{w}{|w|},$$

where $\hat{w}$ is the determined rotational versor, w is the rotational velocity measurements vector and $|w|$ is a magnitude of the rotational velocity measurements vector; estimating the gravity vector according to:

$$g_{prop} = g_{t-1} \cos \theta + (g_{t-1} \times w) \sin \theta + \hat{w}(g_{t-1} \cdot \hat{w})(1 - \cos \theta),$$

where $g_{prop}$ is the estimated gravity vector, $\theta$ is the estimated angular rate of change, and gt−1 is a previous dynamic gravity vector; and generating the dynamic gravity vector according to:

$$g_t = g_{prop} - \alpha e,$$

where $g_t$ is the dynamic gravity vector, $g_{prop}$ is the estimated gravity vector, $\alpha$ is the correction factor, and e is the error vector. In an embodiment, the method comprises: determining the acceleration versor according to:

$$\hat{a} = \frac{a}{|a|}$$

where $\hat{a}$ is the acceleration versor, a is the accelerometer measurements vector and |a| is a magnitude of the acceleration measurements vector. In an embodiment, the method comprises: estimating the error in the estimated gravity vector according to:

$$e = g_{prop} - \hat{a}.$$

where e is the error in the estimated gravity vector $g_{prop}$ and $\hat{a}$ is the acceleration versor.

In an embodiment, a non-transitory computer-readable medium's contents configure processing circuitry to perform a method, the method comprising: estimating an angular rate of change based on rotational data; determining a rotational versor based on the rotational data; estimating a gravity vector based on the angular rate of change and the rotational versor; estimating a linear acceleration based on acceleration data; determining an acceleration versor based on the acceleration data; determining a correction factor based on the linear acceleration; estimating an error in the estimated gravity vector based on the acceleration versor; generating a dynamic gravity vector based on the estimated gravity vector, the correction factor and the estimated error in the estimated gravity vector; and using the dynamic gravity vector to perform an operation of a software application. In an embodiment, the method comprises: generating the rotational data as a rotational velocity measurements vector indicating a rotational velocity with respect to three axes of movement; and generating the acceleration data as an acceleration measurements vector indicating acceleration along the three axes of movement. In an embodiment, the method comprises: estimating the angular rate of change according to:

$$\theta = |w| d\text{time},$$

where θ is the estimated angular rate of change, |w| is a magnitude of the rotational velocity measurements vector w and dtime is a delta-time interval; determining the rotational versor according to:

$$\hat{w} = \frac{w}{|w|},$$

where $\hat{w}$ is the determined rotational versor, w is the rotational velocity measurements vector and |w| is a magnitude of the rotational velocity measurements vector; estimating the gravity vector according to:

$$g_{prop} = g_{t-1} \cos\theta + (g_{t-1} \times \hat{w}) \sin\theta + \hat{w}(g_{t-1} \cdot \hat{w})(1 - \cos\theta),$$

where $g_{prop}$ is the estimated gravity vector, θ is the estimated angular rate of change, and gt−1 is a previous dynamic gravity vector; generating the dynamic gravity vector according to:

$$g_t = g_{prop} - \alpha e,$$

where $g_t$ is the dynamic gravity vector, $g_{prop}$ is the estimated gravity vector, α is the correction factor, and e is the error vector; determining the acceleration versor according to:

$$\hat{a} = \frac{a}{|a|}$$

where $\hat{a}$ is the acceleration versor, a is the accelerometer measurements vector and |a| is a magnitude of the acceleration measurements vector; and estimating the error in the estimated gravity vector according to:

$$e = g_{prop} - \hat{a}.$$

where e is the error in the estimated gravity vector $g_{prop}$ and $\hat{a}$ is the acceleration versor. In an embodiment, the contents comprise instructions executed by the processing circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a memory; and
processing circuitry coupled to the memory, wherein the processing circuitry, in operation:
estimates an angular rate of change based on rotational data;
determines a rotational versor based on the rotational data;
estimates a gravity vector based on the angular rate of change and the rotational versor;
estimates a linear acceleration based on acceleration data;
determines an acceleration versor based on the acceleration data;
determines a correction factor based on the linear acceleration;

estimates an error in the estimated gravity vector based on the acceleration versor; and generates a dynamic gravity vector based on the estimated gravity vector, the correction factor and the estimated error in the estimated gravity vector, wherein the processing circuitry, in operation, estimates the gravity vector according to:

$$g_{prop} = g_{t-1} \cos\theta + (g_{t-1} \times \hat{w})\sin\theta + \hat{w}(g_{t-1} \cdot \hat{w})(1-\cos\theta),$$

where $g_{prop}$ is the estimated gravity vector, $\theta$ is the estimated angular rate of change, and $g_{t-1}$ is a previous dynamic gravity vector.

2. The device according to claim 1, comprising:
a gyroscope, which, in operation, generates the rotational data; and
an accelerometer, which, in operation, generates the acceleration data.

3. The device according to claim 2, wherein:
the gyroscope, in operation, generates a rotational velocity measurements vector indicating a rotational velocity with respect to three axes of movement; and
the accelerometer, in operation, generates an acceleration measurements vector indicating acceleration along the three axes of movement.

4. The device according to claim 3, wherein the processing circuitry, in operation, estimates the angular rate of change according to:

$$\theta = |w|d\text{time},$$

where $\theta$ is the estimated angular rate of change, $|w|$ is a magnitude of the rotational velocity measurements vector w and dtime is a delta-time interval.

5. The device according to claim 4 wherein the processing circuitry, in operation, determines the rotational versor according to:

$$\hat{w} = \frac{w}{|w|},$$

where $\hat{w}$ is the determined rotational versor, w is the rotational velocity measurements vector and $|w|$ is a magnitude of the rotational velocity measurements vector.

6. The device according to claim 3, wherein the processing circuitry, in operation, estimates the linear acceleration based on a magnitude of the acceleration measurements vector.

7. The device according to claim 1, wherein the processing circuitry, in operation, generates the dynamic gravity vector according to:

$$g_t = g_{prop} - \alpha e,$$

where $g_t$ is the dynamic gravity vector, $g_{prop}$ is the estimated gravity vector, $\alpha$ is the correction factor, and e is an error vector.

8. The device according to claim 1, wherein the processing circuitry, in operation, estimates the linear acceleration based on a variance of the acceleration data.

9. The device according to claim 8, wherein the processing circuitry, in operation, applies exponential smoothing to estimate the linear acceleration.

10. A device, comprising:
a memory;
processing circuitry coupled to the memory, wherein the processing circuitry, in operation:
estimates an angular rate of change based on rotational data;
determines a rotational versor based on the rotational data;
estimates a gravity vector based on the angular rate of change and the rotational versor;
estimates a linear acceleration based on acceleration data;
determines an acceleration versor based on the acceleration data;
determines a correction factor based on the linear acceleration;
estimates an error in the estimated gravity vector based on the acceleration versor; and
generates a dynamic gravity vector based on the estimated gravity vector, the correction factor and the estimated error in the estimated gravity vector;
a gyroscope, which, in operation, generates the rotational data, wherein, the gyroscope, in operation, generates a rotational velocity measurements vector indicating a rotational velocity with respect to three axes of movement; and
an accelerometer, which, in operation, generates the acceleration data, wherein, the accelerometer, in operation, generates an acceleration measurements vector indicating acceleration along the three axes of movement, wherein the processing circuitry, in operation, determines the acceleration versor according to:

$$\hat{a} = \frac{a}{|a|}$$

where $\hat{a}$ is the acceleration versor, a is the acceleration measurements vector and $|a|$ is a magnitude of the acceleration measurements vector.

11. A device, comprising:
a memory; and
processing circuitry coupled to the memory, wherein the processing circuitry, in operation:
estimates an angular rate of change based on rotational data;
determines a rotational versor based on the rotational data;
estimates a gravity vector based on the angular rate of change and the rotational versor;
estimates a linear acceleration based on acceleration data;
determines an acceleration versor based on the acceleration data;
determines a correction factor based on the linear acceleration;
estimates an error in the estimated gravity vector based on the acceleration versor; and
generates a dynamic gravity vector based on the estimated gravity vector, the correction factor and the estimated error in the estimated gravity vector, wherein the correction factor is a value between 0 and 1, and the processing circuitry, in operation, determines the correction factor based on a comparison of the estimated linear acceleration to one or more thresholds.

12. The device according to claim 11, wherein the processing circuitry, in operation:
in response to the comparison indicating the estimated linear acceleration exceeds a first threshold, sets the correction factor to a first correction value; and in response to the comparison indicating the estimated linear acceleration is less than a second threshold, sets the correction factor to a second correction value, wherein the first threshold is higher than the second threshold and the first correction value is lower than the second correction value.

13. The device according to claim 12, wherein the processing circuitry, in operation:
in response to the comparison indicating the estimated linear acceleration is between the first threshold and the second threshold, sets the correction factor to a third correction value between the first correction value and the second correction value.

14. A device, comprising:
a memory; and
processing circuitry coupled to the memory, wherein the processing circuitry, in operation:
  estimates an angular rate of change based on rotational data;
  determines a rotational versor based on the rotational data;
  estimates a gravity vector based on the angular rate of change and the rotational versor;
  estimates a linear acceleration based on acceleration data;
  determines an acceleration versor based on the acceleration data;
  determines a correction factor based on the linear acceleration;
  estimates an error in the estimated gravity vector based on the acceleration versor; and
  generates a dynamic gravity vector based on the estimated gravity vector, the correction factor and the estimated error in the estimated gravity vector, wherein the processing circuitry, in operation, estimates the error in the estimated gravity vector according to:

$$e = g_{prop} - \hat{a},$$

where e is the error in the estimated gravity vector gprop and â is the acceleration versor.

15. The device according to claim 14, wherein the processing circuitry, in operation, estimates the gravity vector according to:

$$g_{prop} = g_{t-1} \cos \theta + (g_{t-1} \times \hat{w}) \sin \theta + \hat{w}(g_{t-1} \cdot \hat{w})(1 - \cos \theta),$$

where $g_{prop}$ is the estimated gravity vector, $\theta$ is the estimated angular rate of change, and $g_{t-1}$ is a previous dynamic gravity vector.

16. A system, comprising:
one or more sensors, which, in operation, generate rotational data and acceleration data; and
processing circuitry coupled to the one or more sensors, wherein the processing circuitry, in operation:
  estimates an angular rate of change based on the rotational data;
  determines a rotational versor based on the rotational data;
  estimates a gravity vector based on the angular rate of change and the rotational versor;
  estimates a linear acceleration based on the acceleration data;
  determines an acceleration versor based on the acceleration data;
  determines a correction factor based on the linear acceleration;
  estimates an error in the estimated gravity vector based on the acceleration versor; and
  generates a dynamic gravity vector based on the estimated gravity vector, the correction factor and the estimated error in the estimated gravity vector, wherein the processing circuitry, in operation, estimates the gravity vector according to:

$$g_{prop} = g_{t-1} \cos \theta + (g_{t-1} \times \hat{w}) \sin \theta + \hat{w}(g_{t-1} \cdot \hat{w})(1 - \cos \theta),$$

where $g_{prop}$ is the estimated gravity vector, $\theta$ is the estimated angular rate of change, and $g_{t-1}$ is a previous dynamic gravity vector.

17. The system according to claim 16, wherein the one or more sensors comprise:
a gyroscope, which, in operation, generates the rotational data as a rotational velocity measurements vector indicating a rotational velocity with respect to three axes of movement; and
an accelerometer, which, in operation, generates the acceleration data as an acceleration measurements vector indicating acceleration along the three axes of movement.

18. The system according to claim 17, wherein the processing circuitry, in operation, estimates the angular rate of change according to:

$$\theta = |w| d\text{time},$$

where $\theta$ is the estimated angular rate of change, $|w|$ is a magnitude of the rotational velocity measurements vector w and dtime is a delta-time interval.

19. A method, comprising:
estimating an angular rate of change based on rotational data;
determining a rotational versor based on the rotational data;
estimating a gravity vector based on the angular rate of change and the rotational versor;
estimating a linear acceleration based on acceleration data;
determining an acceleration versor based on the acceleration data;
determining a correction factor based on the linear acceleration;
estimating an error in the estimated gravity vector based on the acceleration versor;
generating a dynamic gravity vector based on the estimated gravity vector, the correction factor and the estimated error in the estimated gravity vector; and
using the dynamic gravity vector to perform an operation of a software application, wherein the gravity vector is estimated according to:

$$g_{prop} = g_{t-1} \cos \theta + (g_{t-1} \times \hat{w}) \sin \theta + \hat{w}(g_{t-1} \cdot \hat{w})(1 - \cos \theta),$$

where $g_{prop}$ is the estimated gravity vector, $\theta$ is the estimated angular rate of change, and $g_{t-1}$ is a previous dynamic gravity vector.

20. The method according to claim 19, comprising:
generating the rotational data as a rotational velocity measurements vector indicating a rotational velocity with respect to three axes of movement; and
generating the acceleration data as an acceleration measurements vector indicating acceleration along the three axes of movement.

21. The method according to claim 20, comprising:
estimating the angular rate of change according to:

$$\theta = |w| d\text{time},$$

where θ is the estimated angular rate of change, |w| is a magnitude of the rotational velocity measurements vector w and dtime is a delta-time interval;
determining the rotational versor according to:

$$\hat{w} = \frac{w}{|w|},$$

where $\hat{w}$ is the determined rotational versor, w is the rotational velocity measurements vector and |w| is a magnitude of the rotational velocity measurements vector; and
generating the dynamic gravity vector according to:

$$g_t = g_{prop} - \alpha e,$$

where $g_t$ is the dynamic gravity vector, $g_{prop}$ is the estimated gravity vector, α is the correction factor, and e is an error vector.

* * * * *

UNITED STATES PATENT AND TRADEMARK OFFICE
CERTIFICATE OF CORRECTION

| | | |
|---|---|---|
| PATENT NO. | : 12,164,705 B2 | Page 1 of 1 |
| APPLICATION NO. | : 18/059214 | |
| DATED | : December 10, 2024 | |
| INVENTOR(S) | : Federico Rizzardini et al. | |

It is certified that error appears in the above-identified patent and that said Letters Patent is hereby corrected as shown below:

In the Claims

Column 17, Claim 14, Line 41:
"gprop" should read: --$g_{prop}$--.

Signed and Sealed this
Eleventh Day of February, 2025

Coke Morgan Stewart
*Acting Director of the United States Patent and Trademark Office*